US008880510B2

(12) United States Patent
Fricke et al.

(10) Patent No.: US 8,880,510 B2
(45) Date of Patent: Nov. 4, 2014

(54) UNIQUE VALUE CALCULATION IN PARTITIONED TABLES

(75) Inventors: Lars Fricke, Worms (DE); Sangyong Hwang, Leimen (DE)

(73) Assignee: SAP SE, Walldorf (DE)

(*) Notice: Subject to any disclaimer, the term of this patent is extended or adjusted under 35 U.S.C. 154(b) by 150 days.

(21) Appl. No.: 13/336,928

(22) Filed: Dec. 23, 2011

(65) Prior Publication Data

US 2013/0166557 A1 Jun. 27, 2013

(51) Int. Cl.
*G06F 17/30* (2006.01)
(52) U.S. Cl.
USPC .................... 707/719; 707/737; 707/758
(58) Field of Classification Search
CPC .............. G06F 17/30584; G06F 17/30445; G06F 17/30442; G06F 17/30469; G06F 17/30498; G06F 17/30545; G06F 17/30315; G06F 17/30657; G06F 17/30864
See application file for complete search history.

(56) References Cited

U.S. PATENT DOCUMENTS

| 6,029,163 | A  | * | 2/2000  | Ziauddin ........................ 1/1 |
| 7,233,944 | B2 | * | 6/2007  | Ahmed ........................... 1/1 |
| 7,260,563 | B1 | * | 8/2007  | Priyadarshi et al. ........ 707/714 |
| 7,366,716 | B2 | * | 4/2008  | Agrawal et al. ................ 1/1 |
| 7,634,457 | B2 | * | 12/2009 | Lawande ......................... 1/1 |
| 7,747,609 | B1 | * | 6/2010  | Au et al. ...................... 707/714 |
| 8,078,610 | B2 | * | 12/2011 | Molini ........................ 707/714 |
| 8,359,316 | B2 | * | 1/2013  | Franke et al. ................ 707/737 |
| 8,549,004 | B2 | * | 10/2013 | Lakshminarayan et al. .. 707/737 |
| 2006/0149695 | A1 | * | 7/2006 | Bossman et al. ............... 706/48 |
| 2008/0162413 | A1 | * | 7/2008 | Kirk et al. ...................... 707/2 |
| 2011/0282864 | A1 | * | 11/2011 | Collins et al. ............... 707/719 |

OTHER PUBLICATIONS

Oracle: "Oracle9i Database Performance Tuning Guide and Reference, Release 2 (9.2)", 2002, Retrieved from the Internet: <URL:http://docs.oracle.com/cd/B10501_01/server.920/a96533/stats.htm>.
Chaudhuri, et al., "AutoAdmin what-if index analysis utility", SIGMOD Record, vol. 27, No. 2, pp. 367-378, Jun. 1, 1998.
Abadi et al. "Column-Stores vs. Row-Stores: How Different Are They Really." *SIGMOD '08.* Jun. 9-12, 2008. Vancouver, BC, Canada. 2008: pp. 1-14.
Flajolet, Philippe and Martin, G. Nigel. "Probabilistic Counting Algorithims for Data Base Applications." *Journal of Computer and System Sciences.* Academic Press. New York. vol. 31. No. 2. Oct. 1985. pp. 182-209.

* cited by examiner

*Primary Examiner* — Michelle Owyang
(74) *Attorney, Agent, or Firm* — Mintz Levin Cohn Ferris Glovsky and Popeo, P.C.

(57) ABSTRACT

An estimation algorithm can generate a uniqueness metric representative of data in a database table column that is split across a plurality of data partitions. The column can be classified as categorical if the uniqueness metric is below a threshold and as non-categorical if the uniqueness metric is above the threshold. A first estimation factor can be assigned to the column if the column is classified as categorical or a larger second estimation factor can be assigned if the column is non-categorical. A cost estimate for system resources required to perform a database operation on the database table can be calculated. The cost estimate can include an estimated total number of distinct values in the column across all of the plurality of data partitions determined using the assigned first estimation factor or second estimation factor and a number of rows in the table as inputs to an estimation function.

19 Claims, 6 Drawing Sheets

UNIQUE VALUE CALCULATION IN PARTITIONED TABLES

TECHNICAL FIELD

The subject matter described herein relates to manipulations of partitioned database tables.

BACKGROUND

In recent years, central processing units (CPUs) of computer processing hardware have generally experienced their greatest performance increases by increasing the number of processor cores rather than through increasing clock rates. Accordingly, to maximize performance, modern software advantageously employs the benefits of multi-core CPUs by allowing parallel execution and with architectures that scale well with the number of cores. For data management systems, taking full advantage of parallel processing capabilities generally requires partitioning of stored data into sections or "partitions" for which the calculations can be executed in parallel.

A database program or database management system generally displays data as two-dimensional tables, of columns and rows. However, data are typically stored as one-dimensional strings. A row-based store typically serializes the values in a row together, then the values in the next row, and so on, while a column-based store serializes the values of a column together, then the values of the next column, and so on.

In general, column-based systems are more efficient when an aggregate needs to be computed over many rows but only for a notably smaller subset of all columns of data, because reading that smaller subset of data can be faster than reading all data. Column-based systems can be more efficient when new values of a column are supplied for all rows at once, because that column data can be written efficiently and replace old column data without touching any other columns for the rows. Row-based systems can be more efficient when many columns of a single row are required at the same time, and when row-size is relatively small, as the entire row can be retrieved with a single disk seek. Row-based systems can also be more efficient when writing a new row if all of the column data is supplied at the same time, as the entire row can be written with a single disk seek.

Column-based storage can facilitate execution of operations in parallel using multiple processor cores. In a column store, data are already vertically partitioned, so operations on different columns can readily be processed in parallel. If multiple columns need to be searched or aggregated, each of these operations can be assigned to a different processor core. In addition, operations on one column can be parallelized by partitioning the column into multiple sections that are processed by different processor cores. Column data is typically of uniform type, which can facilitate opportunities for storage size optimizations available in column-based data stores that are not available in row-based data stores. For example, some modern compression schemes can make use of the similarity of adjacent data to compress. To improve compression of column-based data, typical approaches involve sorting the rows. For example, using bitmap indexes, sorting can often improve compression by approximately an order of magnitude. In conventional systems, columnar compression generally achieves a reduction in storage space requirements at the expense of efficiency of retrieval. Retrieving all data from a single row can be more efficient when that data is located in a single location, such as in a row-based architecture. Further, the greater adjacent compression achieved, the more difficult random-access may become, as data typically need to be uncompressed to be read. Therefore, conventional column-based architectures are often enriched by additional mechanisms aimed at minimizing the need for access to compressed data. These additional mechanisms can result in lower compression efficiency and/or increased processing requirements to access the compressed data.

Currently available relational database management systems can accomplish partitioning based on specified criteria applied to split the database. In general, a partitioning key is used to assign a partition based on certain criteria. Commonly used approaches include range partitioning, list partitioning, hash partitioning, round robin partitioning, and composite partitioning. In range partitioning, a partition can be defined by determining if the partitioning key is inside a certain range. For example, a partition can be created to include for all rows in which values in a column of postal codes are between 70000 and 79999. In list partitioning, a partition can be assigned a list of values and the partition can be chosen if the partitioning key has one of the values on the list. For example, a partition built to include data relating to Nordic countries can includes all rows in which a column of country names includes the text string values Iceland, Norway, Sweden, Finland, Denmark, etc. In hash partitioning, the value of a hash function can determine membership in a partition. For example, for a partitioning scheme in which there are four partitions, the hash function can return a value from 0 to 3 to designate one of the four partitions. Round robin partitioning can be used to distribute storage and/or processing loads among multiple data partitions and/or servers or server processes according to a pre-set rotation among the available partitions or servers or server processes. As an example, a first data unit can be directed to a first partition of three partitions, a second data unit to the second partition, a third data unit to the third partition, a fourth data unit to the first partition, and so forth. In composite partitioning, certain combinations of other partitioning schemes can be allowed, for example by first applying a range partitioning and then a hash partitioning.

SUMMARY

In one aspect, a method includes applying an estimation algorithm to generate a uniqueness metric representative of data in a column of a database table that is split across a plurality of data partitions, classifying the column as categorical or non-categorical by comparing the uniqueness metric to a threshold, and assigning one of a first estimation factor and a second estimation factor to the column. The assigning includes the first estimation factor if the column is classified as categorical and the second estimation factor if the column is classified as non-categorical. The second estimation factor is larger than the first estimation factor. The method further includes calculating a cost estimate for system resources required to perform a database operation on the database table and promoting the cost estimate. The cost estimate includes an estimated total number of distinct values in the column across all of the plurality of data partitions determined using the assigned first estimation factor or second estimation factor and a number of rows in the table as inputs to an estimation function.

In some variations or the current subject matter, one or more of the following features can optionally be included in any feasible combination. The promoting of the cost estimate can optionally include using the cost estimate in developing at least part of an operation plan for performing one or more database operations involving at least one of the column and other columns of the database table in an optimal order, displaying the cost estimate via a display device associated with a computing system or device, sending an electronic message containing the cost estimate to a user or to another machine, and generating a report that includes the cost estimate. The one or more database operations can optionally include a join.

The estimation algorithm can optionally include selecting one data partition of the plurality of data partitions, querying a dictionary of the selected data partition for a total number of unique values in the column in the selected data partition, calculating a ratio of the total number of unique values to a number of rows of the column contained in the selected data partition, assuming that the ratio is representative of a distribution of unique values in all other data partitions of the plurality of data partitions, and returning the calculated ratio as the uniqueness metric. The estimation algorithm can additionally or alternatively optionally include querying a dictionary on each of two or more data partitions of the plurality of data partitions, comparing the random samples returned from the dictionary on each of the two or more data partitions; and returning the uniqueness metric as a degree of dissimilarity between the random samples. The querying can optionally include requesting a random sample comprising a preset number of the unique values in the column on each of the two or more data partitions. The estimation algorithm can additionally or alternatively optionally include requesting that a dictionary from each of one or more selected data partitions of the plurality of data partitions return a respective Bloom filter of a same, specific size, and returning the uniqueness metric based on a degree to which the returned Bloom filter from the one or more selected data partitions is filled. As used herein, a dictionary can include a listing of unique values of the respective column in a respective data partition.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

The number of distinct attributes in a table, for example the number of distinct values in one or more columns, can be an important determination in efficient database management, particularly for management of large databases that are split across multiple data partitions, which can optionally be controlled by separate data servers or data server processes. For example, determinations of resources required for operations such as joins and the like can be necessary for scheduling of and allocation of sufficient resources to such operations. Multiple joins are often required for such operations, and determining an operation plan for performing those joins or other operations in an optimal order can also require at least an estimation of the number of non-duplicative values in one or more columns of the table as they are split across data partitions. However, in a partitioned table, it can be expensive to determine an exact count of distinct values. Generally, a count of the number of distinct values in each partition must be determined and then these calculations must be merged together to eliminate duplicates. For example, a first partition may include in its unique count a value that also appears on another partition and is therefore also counted as unique on that second partition. Such calculations can be difficult to perform in a partitioned table without generating substantial runtime traffic, which can be costly in terms of performance.

Methods, systems, articles of manufacture, and the like consistent with, one or more implementations of the current subject matter can, among other possible advantages, provide an improved approach to acquiring a reasonable estimate of the number of distinct values in a table that is split across multiple data partitions. In this manner excess reading of partitions to determine processing demands, etc. for one or more table or column operations can be avoided.

Consistent with one or more implementations, based on a small sampling of values in a column or multiple columns, each column can be is classified as either a categorical column or a non-categorical column. As used herein, a categorical column can be a column that is estimated to contain substantially fewer unique values than there are rows in the column. In other words, such a column contains data values that repeat frequently among the individual data records. As non-limiting examples, data contents of a categorical column can include countries, states, departments, cities, eye colors, part numbers, zip codes, organizational roles, etc.

Figure 1:
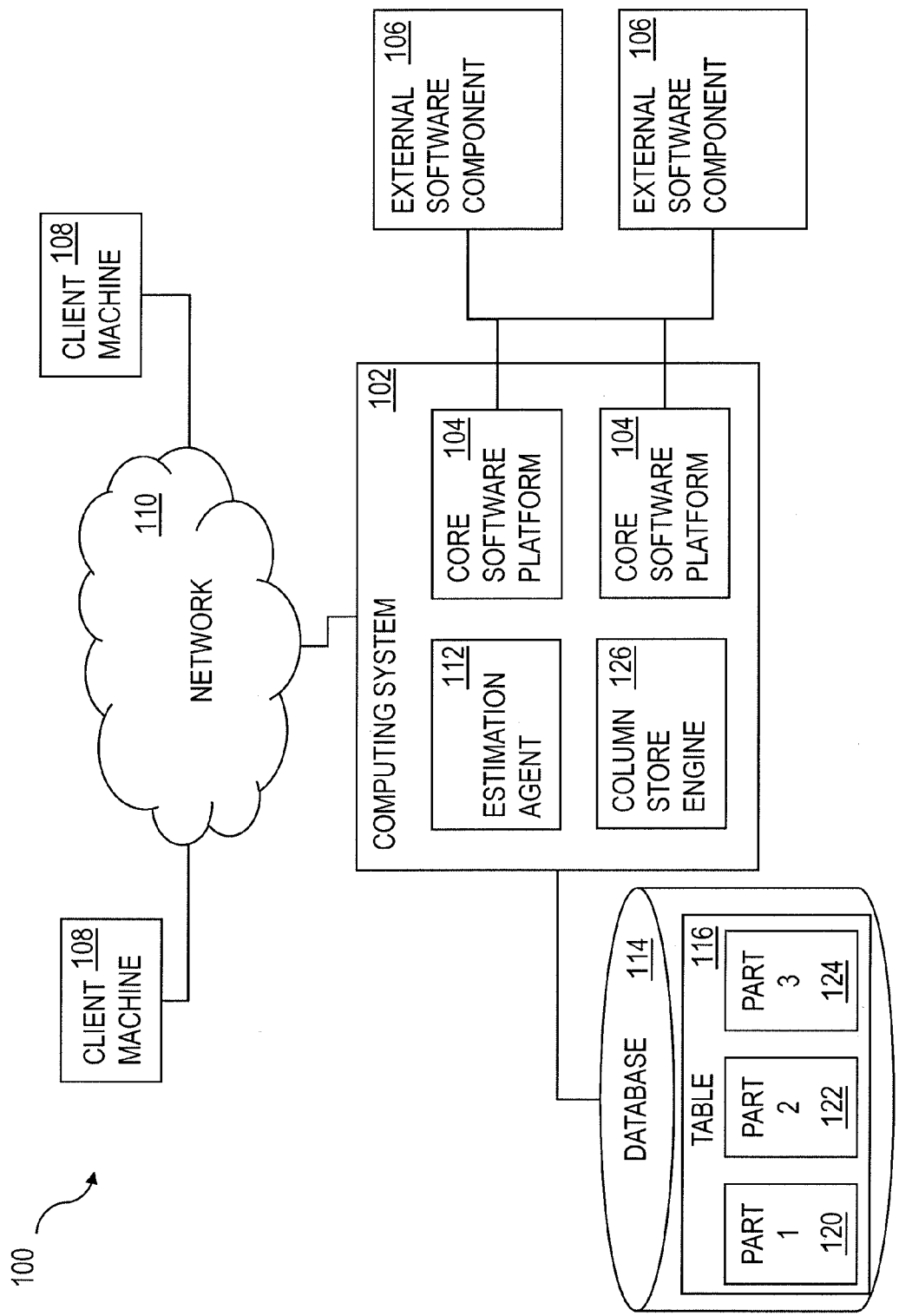
FIG. 1 is a diagram illustrating features of a business software system architecture consistent with at least some implementations of the current subject matter.

FIG. 1 shows a diagram of a system that can implement one or more features of the current subject matter. A computing system 102 can include one or more core software platform modules 104 providing one or more features of a business software system or other software that includes database management features. The computing system can also aggregate or otherwise provide a gateway via which users can access functionality provided by one or more external software components 106. One or more client machines 108 can access the computing system, either via a direct connection, a local terminal, or over a network 110 (e.g. a local area network, a wide area network, a wireless network, the Internet, or the like).

An estimation agent 112 or other comparable functionality can access a database 114 that includes at least one table 116, which can in turn include at least one column. The estimation agent 112 can implement an estimation algorithm that causes one or more processors of the computing system to perform one or more of the functions described herein. The database table can store any kind of data, potentially including but not limited to definitions of business scenarios, business processes, and one or more business configurations as well as transactional data, metadata, master data, etc. relating to instances or definitions of the business scenarios, business processes, and one or more business configurations, and/or concrete instances of data objects and/or business objects that are relevant to a specific instance of a business scenario or a business process, and the like. A table can split across one or more data partitions 120, 122, 124, which can be accessible via a single server or server process, or alternatively via two or more parallel servers or server processes, for example as described below. A column store engine 126, which can be part of a database management module, etc. can maintain a dictionary that contains a listing of the unique (distinct, etc.) values for each of the multiple partitions 120, 122, 124 per column of the table.

Figure 2:
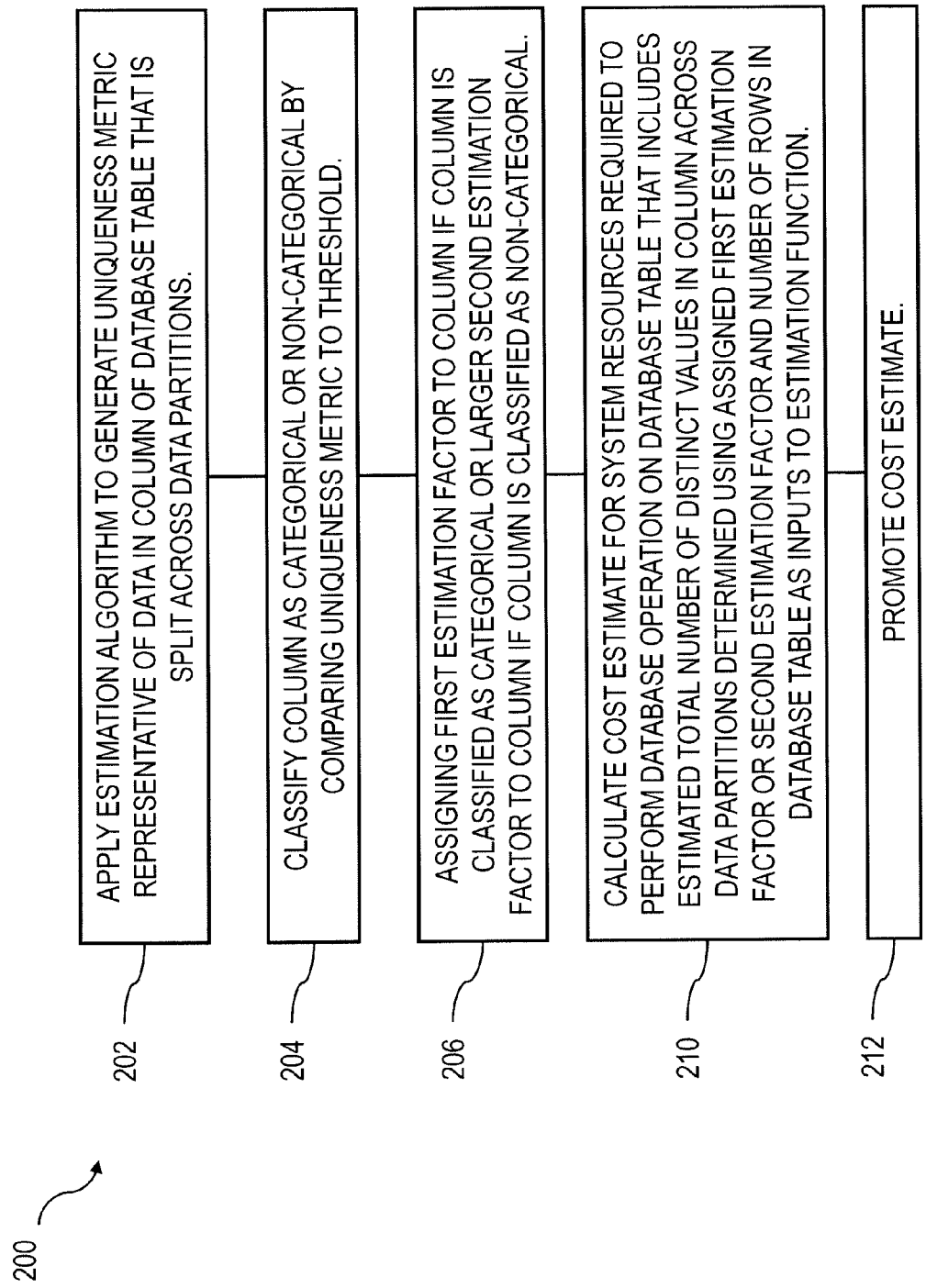
FIG. 2 is a process flow diagram illustrating aspects of a method having one or more features consistent with at least some implementations of the current subject matter.

FIG. 2 shows a process flow chart 200 illustrating method features, one or more of which can be included in implementations of the current subject matter. At 202, an estimation algorithm is applied, for example by the estimation agent or in some other manner by the one or more processors, to generate a uniqueness metric representative of data in a column of a database table. The column is split across a plurality of data partitions, for example as discussed above. The uniqueness metric can be calculated using one of several possible estimation algorithms. At 204 the column is classified as categorical or non-categorical by comparing the uniqueness metric to a threshold. A first or a second estimation factor is assigned to the column at 206. The first estimation factor is assigned to the column if the column is classified as categorical, and the second estimation factor, which is larger than the first estimation factor, is assigned to the column if the column is classified as non-categorical. A cost estimate for system resources required to perform a database operation on the database table is calculated at 210. The cost estimate includes an estimated number of distinct values in the column across all of the plurality of data partitions that is determined using the assigned first estimation factor or second estimation factor and a number of rows in the table as inputs to a cost estimation function.

The cost estimate is promoted at 212. Promoting can include using the cost estimate in developing or determining at least part of an operation plan for performing joins or other database operations involving the column and/or one or more other columns of the database table in an optimal order. Partitioning can also optionally include displaying the cost estimate via a display device associated with a computing system or device, sending an electronic message containing the cost estimate to a user or to another machine, generating a report that includes the cost estimate, for example in a ranking of columns by estimated numbers of unique values, and the like.

In some implementations, the estimation algorithm can include selecting one partition of the plurality of partitions and querying the dictionary of the selected data partition for a total number of unique values in the column in the selected data partition. A ratio of unique values to a number of rows of the column contained in the selected data partition is calculated and assumed to be representative of the distribution of unique values in all other data partitions of the plurality of data partitions. The uniqueness metric in this example can be the calculated ratio of unique values to number of rows. If the number of unique values for the column in the selected data partition is substantially smaller than the number of rows (e.g. the ratio of unique values to rows is below a threshold), the column is classified as being categorical.

In other implementations, the estimation algorithm can send a query to the dictionary on two or more data partitions of the plurality of data partitions. The query can request a random sampling of a preset number of the unique values in the column on each of the two or more data partitions. The two or more data partitions can optionally include all of the plurality of data partitions. The random samples returned from the dictionary on the two or more data partitions can be compared, and the uniqueness metric can represent a degree of similarity between the random samples. In this example, if the similarity between the random samples is above a threshold, the column can be classified as categorical as the duplication of unique values between the column parts in the sampled data partitions is indicative of a lower degree of uniqueness. If the similarity between the random samples is below the threshold, the column can be classified as non-categorical.

In another implementation, an estimation algorithm can make use of a Bloom filter, which is type of a space-efficient probabilistic data structure for testing whether an element is a member of a set. The estimation algorithm can request that the dictionary from one or more data partitions of the table or column return a bloom filter of a same, specific size. The degree to which the Bloom filter for each sampled partition is filled can be used to determine whether the column should be classified as categorical or not. For example, if the Bloom filter result for the one or more data partitions is filled to less than a predetermined threshold amount, the column can be classified as categorical. If the Bloom filter result for the one or more data partitions is filled to greater than the predetermined threshold amount, the column can be classified as non-categorical. In another example, bloom filters generated using a same size and hash function for two or more partitions can be compared. The column can be classified as categorical if the set bits are mostly the same and non-categorical if the set bits are not mostly the same.

Some implementations of the current subject matter can be used in conjunction with a multi-level partitioning approach. In one non-limiting example illustrated in FIG. 3, range partitioning according to months can be used to divide data records among multiple partitions on each of several parallel servers or data server processes. As shown in the framework 300 of FIG. 3, a database can be range partitioned into one partition for each month of the first quarter of a year. Accordingly, a level 3 first data partition 302 on a first data process server 304 is sub-partitioned into a level 2 first January partition 306, a level 2 first February partition, 308, and a level 2 first March partition 310. A level 1 second data partition 312 on a second data process server 314 is sub-partitioned into a level 2 second January partition 316, a level 2 second February partition, 318, and a level 2 second March partition 320.

Figure 3:
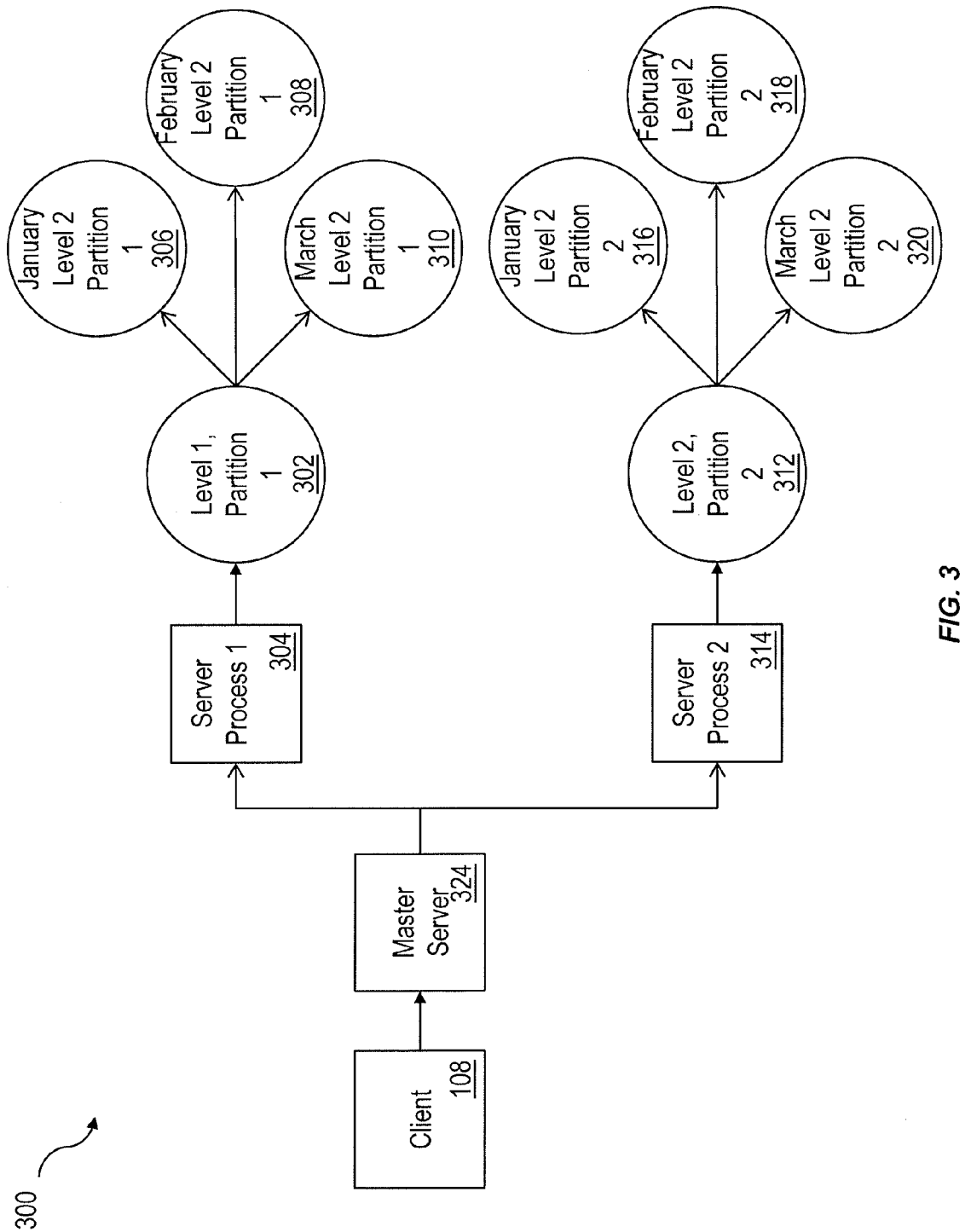
FIG. 3 is a diagram illustrating features of a multi-level partitioning approach consistent with at least some implementations of the current subject matter.

In the example illustrated in FIG. 3, the partitioning of data on the database between the level 1 first database partition 302 and the level 1 second database partition 312 can be accomplished using a hash partitioning approach in which a hash value is calculated for a data record using a hash function based on values for the data record in one or more columns of the database. FIG. 3 shows two server processes 304, 314 respectively hosting the two level 1 partitions 302, 312, but this simplified depiction is not intended as a limitation. Any number of parallel server processes with associated level 1 data partitions is within the scope of the current subject matter. Additionally, the first level partitioning need not be between two or more server processes but can instead be performed within a single server process.

FIG. 3 also shows a client 108 communicating with a master server 324 that can direct data requests and queries as well as new data to be stored to the appropriate one of the two or more level 1 data partitions 302, 312 on the two or more server processes 304, 314. In some implementations, the master server 324 can perform the calculation of the hash function to determine the hash value that dictates which of the server processes 304, 314 receives new data and where to find new data in response to a query or request. In other implementations consistent with aspects of the current subject matter, the client 108 can perform one or more of the above-noted functions of the master server 324 and can optionally eliminate the need for a separate master server 324 in distributing and maintaining data across two or more parallel server processes 304, 314. In still other implementations, the master server can be considered as a passive resource, for example a repository storing metadata or other data, rules, attributes, criteria, etc. that can be called by one or more or all of a standalone master server machine or machines, one or more index servers that can be co-located with one of the server processes 304, 314, the client 108, etc.

In addition, while the approach depicted in FIG. 3 employs hash partitioning to distribute data among the parallel server processes 304, 314 and range partitioning to further distribute data from each of the two or more level 1 partitions 302, 312 into second level partitions (e.g. sub-partitions), implementations using these or other partitioning approaches or other partitioning approaches (e.g. round robin partitioning) in a different order are also within the scope of the current subject matter. For example, range partitioning (or some other partitioning approach) can be used at the first level to distribute data among two or more parallel server processes, and hash partitioning (or some other partitioning approach different than the partitioning approach used at the first level) can be used at the second level. Range partitioning can be applied on any data that are amenable to being orders (e.g. postal codes, dates, phone numbers, catalog numbers etc.). The use of date values in range partitioning as discussed herein can be particularly advantageous in certain applications in which the date itself is a query value provided within a query of the database. In this case, the query itself can designate which level 2 partition needs to be searched to reply to the query. In still other implementations, multi-level partitioning can be performed within a single server process or physical server. In this manner, a multi-level partitioning tree structure can create multiple sub-partitions of the data storage with improved parallelism that can improve the efficiency of database operations such as indexing, merging, pruning, data retrieval, and the like.

Use of hash partitioning as the first partitioning method for the level 1 partitioning and range partitioning as the second partitioning method for the level 2 partitioning can be advantageous in enabling time-based partitioning without requiring that older data be frequently merged or compressed with newer data. In a conventional approach, data loaded into a table must eventually be merged into a main index. The timing of such a merge is typically based on the size of the main index. By partitioning at the second level according to a temporal range (e.g. month, week, year, or some other period of time), more recent (and therefore generally more frequently accessed) data records are kept together while older data records remain in partitions that do not need to be accessed (and therefore re-indexed and/or decompressed and re-compressed) as frequently.

Using hash partitioning, for example as the first partitioning method for the first level partition between the data sever processes, one or more columns containing line item numbers or some other key value that includes substantial variation among data records (varies a lot) can be chosen as the hash column. A hash value can be calculated based on the data record values in each of one or more columns using a hash function. If multiple columns are used, the hash function can include concatenation of the data record values in the multiple columns. The first partitioning method can optionally include round robin partitioning, range partitioning, or some other form or partitioning in other implementations.

The second partitioning approach, which can optionally include range partitioning (or can optionally include hash partitioning, round robin partitioning, or some other form of partitioning), can include evaluation of a second partitioning criteria based on one or more second columns, which do not include the one or more first columns used in evaluation of the first partitioning criteria. As such, while the first partitioning criteria can include a primary key value for the data record, the second partitioning criteria does not.

In further variations, an additional partitioning level can be used in addition to the level 1 and level 2 partitioning levels discussed above. For example, an additional layer can include an additional hash partitioning level. In some implementations, a third partitioning layer can be used, for example in place of history tables used to track changes to the database or one or more tables in the database.

One potential use for various implementations of the current subject matter can include handling of the database demands of an enterprise resource planning (ERP) system, other business software architecture, or other data-intensive computing application or software architecture. Such applications can, in some examples, be provided as a standalone, customized software installation that runs on one or more processors that are under the control of a specific organization. This arrangement can be very effective for a large-scale organization that has very sophisticated in-house information technology (IT) staff and for whom a sizable capital investment in computing hardware and consulting services required to customize a commercially available business software solution to work with organization-specific business processes and functions is feasible. The diagram of FIG. 1 depicts an example of such a system.

Figure 4:
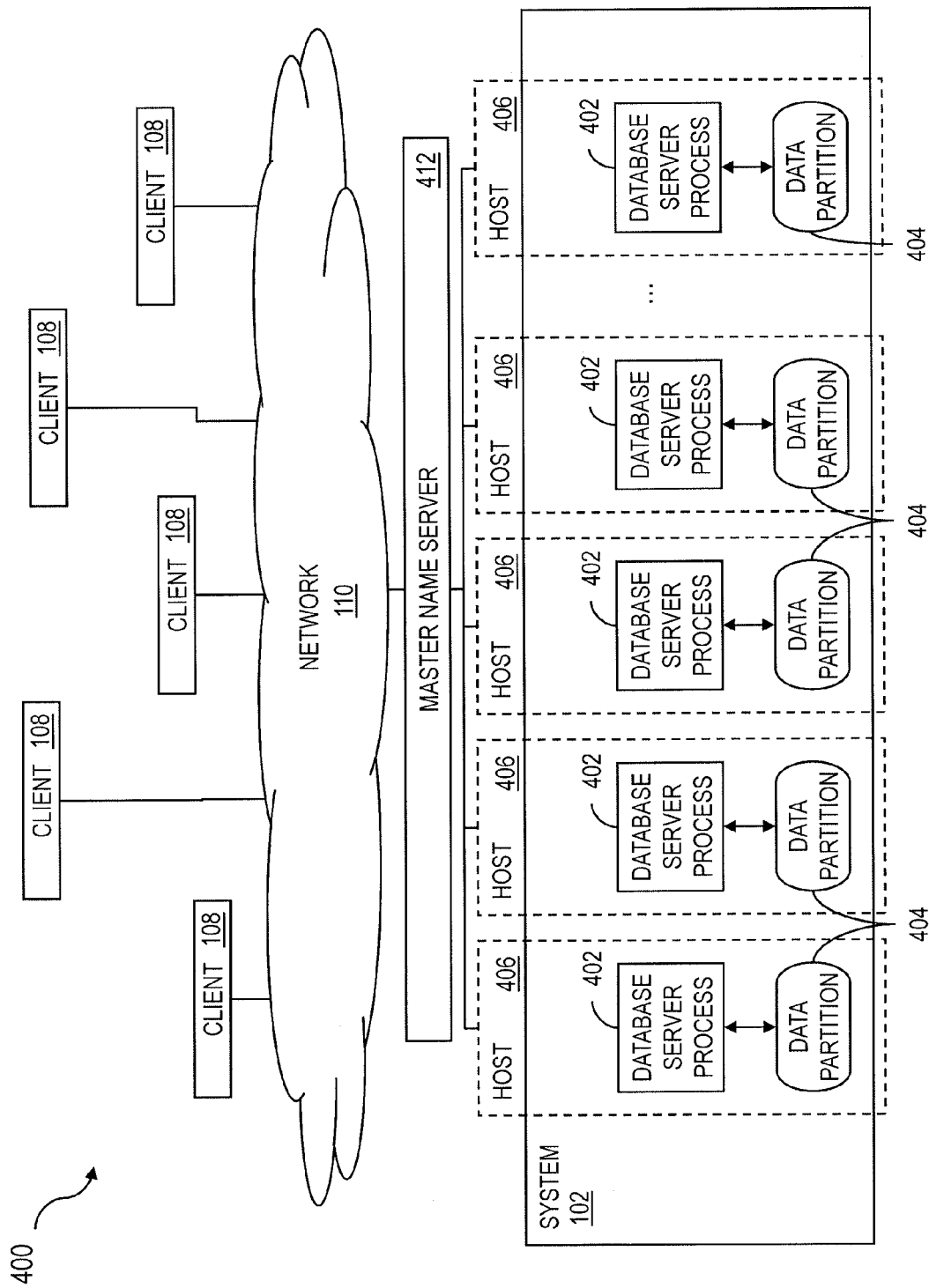
FIG. 4 is a diagram illustrating features of a database management system architecture consistent with at least some implementations of the current subject matter.

Alternatively or in addition, tables or ranges within tables can be assigned to different database partitions that are assigned to different hosts, for example data distribution and/or scalability reasons. FIG. 4 shows an example of an enterprise resource system architecture 400 consistent with an implementation that includes data distribution for scalability reasons. Such a configuration can be used for large, on-premise or stand-alone systems with high performance requirements. Each data server process 402 and its associated data partition 404 can be assigned to a discrete host 406. A host 406 can be a standalone machine with one or more physical processors or a virtual machine on a larger system 302 as depicted in FIG. 4. A central component, labeled as a name server 412 in FIG. 4, knows the topology of the system and how data is distributed. In a system with data distribution, the name server knows which tables or partitions of tables are located on which data server process 402. One or more clients 414 (e.g. client machines 108) can access the name server 412, either via a direct connection or over a network 416.

In a data distribution scenario, the partitioning can be done table wise or also by splitting tables. With table wise partitioning, the name server assigns new tables to a database server process 402 based on the current distribution of tables (number of tables assigned to each database server process 402). Then data for this table will reside only on that database server process 402. It is also possible to specify that a table is split over multiple database server processes 402. The name server 412 can optionally partition the table based on a size estimation specified by the application. When records are inserted into a split table, the records can be distributed to other database server processes 402 based on name server information.

Smaller organizations can also benefit from use of business software functionality. However, such an organization may lack the necessary hardware resources, IT support, and/or consulting budget necessary to make use of a standalone business software software architecture product and can in some cases be more effectively served by a software as a service (SaaS) arrangement in which the business software system architecture is hosted on computing hardware such as servers and data repositories that are maintained remotely from the organization's location and accessed by authorized users at the organization via a thin client, such as for example a web browser, over a network.

In a software delivery configuration in which services of an business software system are provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Figure 5:
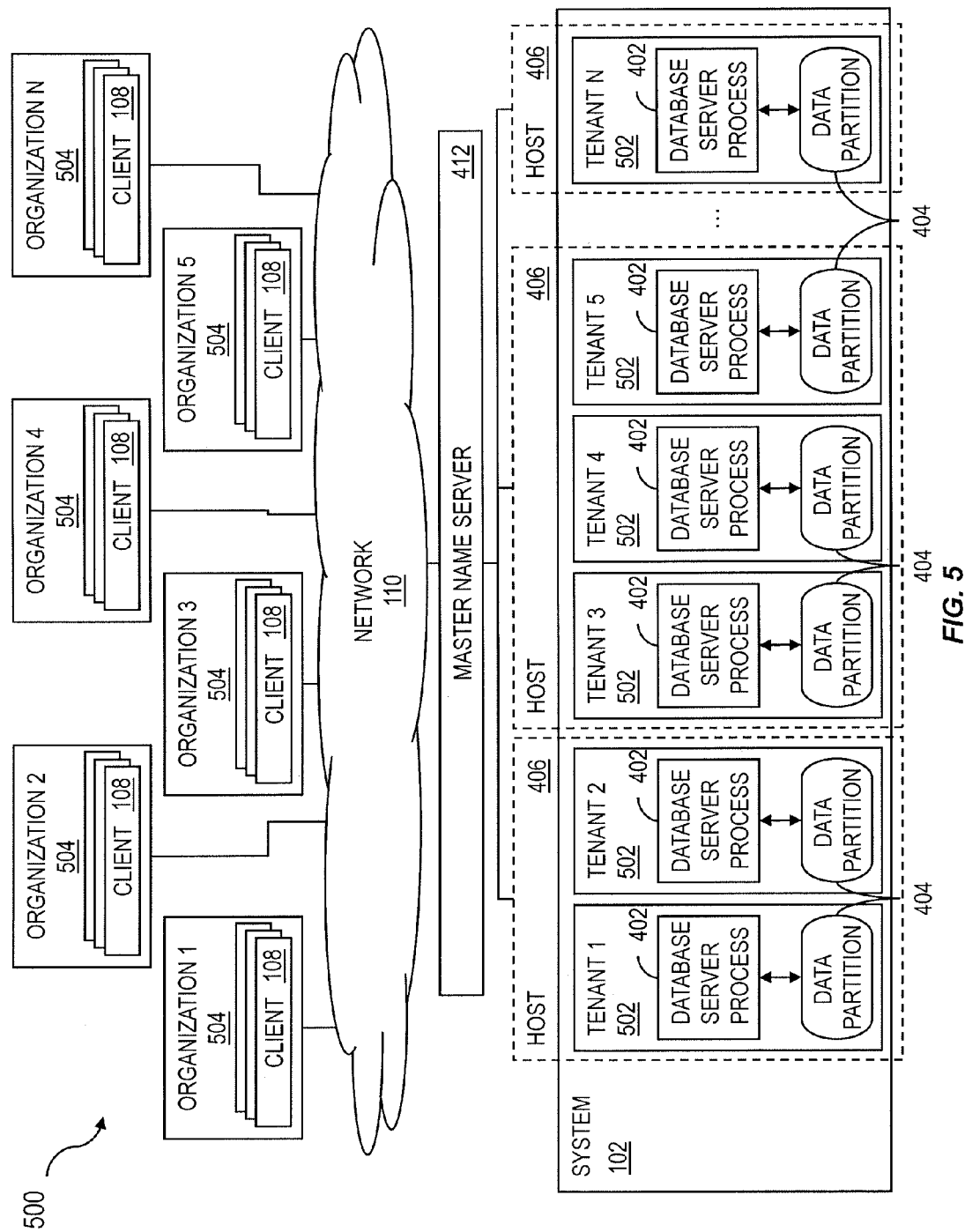
FIG. 5 is a diagram illustrating features of another database management system architecture consistent with at least some implementations of the current subject matter.

Data partitioning consistent with implementations of the current subject matter can also be used in a multi-tenancy environment as illustrated in the system architecture 500 of FIG. 5. Multiple tenants 502, each isolated from one another and available to be accessed by clients 414 within a separate organization 504 of a plurality of organizations via a network 416, can be hosted by a same host 406, which can be a virtual machine on a larger system 302 as shown in FIG. 5 or a separate system that includes one or more physical processors. Tenants 502 can also optionally be distributed across multiple database server processes 402 on more than one host 406. In this manner, tables or ranges within tables are assigned to different database server processes 402 that are assigned to different hosts 406 for scalability reasons. One or more tenants 502 can alternatively be served by a single database server process 402 accessing a data partition 404 (or multiple data partitions 404) for the respective tenant 502 that is isolated from other tenants 502.

Figure 6:
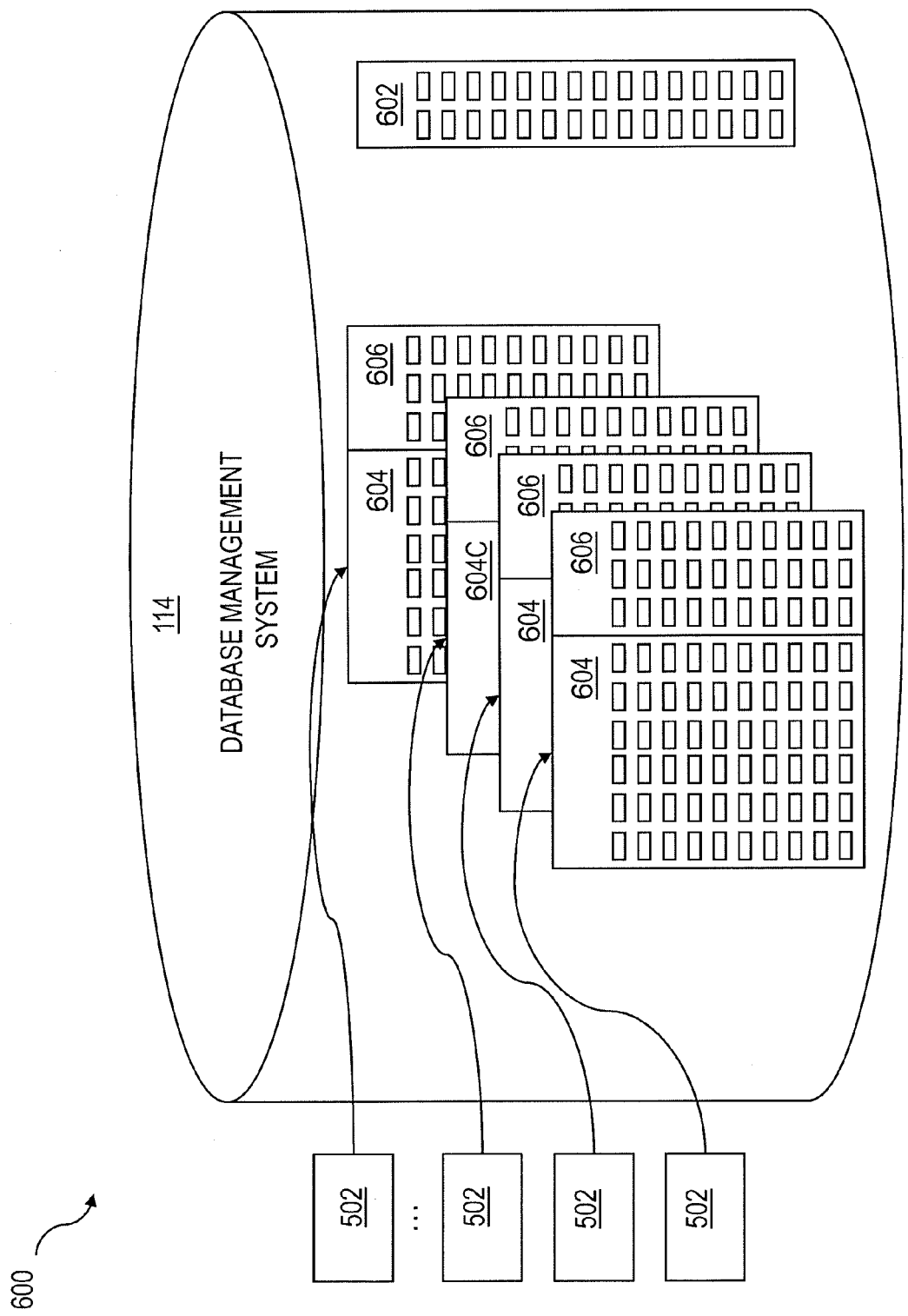
FIG. 6 is a diagram illustrating features of a multi-tenancy database structure consistent with at least some implementations of the current subject matter.

To provide for customization of the business process for each of multiple organizations supported by a single software delivery architecture 500, the data and data objects stored by a database management system 314 can include three types of content as shown in FIG. 6: core software platform content 602 (e.g. a standard definition of a business process), system content 604, and tenant content 606. Core software platform content 602 includes content that represents core functionality and is not modifiable by a tenant. System content 604 can in some examples be created by the runtime of the core software platform and can include core data objects that store concrete data associated with specific instances of a given business process and that are modifiable with data provided by each tenant. The data retained in these data objects are tenant-specific: for example, each tenant 502 of the group of tenants can store information about its own inventory, sales order, etc. Tenant content 606 for isolated to each tenant 502 of the group of tenants includes data objects or extensions to other data objects that are customized for one specific tenant 502 of the group of tenants to reflect business processes and data that are specific to that specific tenant and are accessible only to authorized users at the corresponding tenant. Such data objects can include a key field (for example "client" in the case of inventory tracking) as well as one or more of master data, business configuration information, transaction data or the like. For example, tenant content 606 can reflect tenant-specific modifications or changes to a standard template definition of a business process as well as tenant-specific customizations of the business objects that relate to individual process step (e.g. records in generated condition tables, access sequences, price calculation results, other tenant-specific values, or the like). A combination of the software platform content 602 and system content 604 and tenant content 606 of a specific tenant 502 of the group of tenants are accessed to provide the business process definition and/or the status information relating to a specific instance of the business process according to customizations and business data of that tenant such that each tenant 502 of the group of tenants is provided access to a customized solution whose data are available only to users from that tenant 502.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable medium storing instructions that, when executed by at least one programmable processor, cause the at least one programmable processor to perform operations comprising:
   applying an estimation algorithm to generate a uniqueness metric representative of data in a column of a database table, the column being split across a plurality of data partitions;
   classifying the column as categorical or non-categorical by comparing the uniqueness metric to a threshold, wherein the column is classified as categorical if the uniqueness metric is less than the threshold, and the column is classified as non-categorical if the uniqueness metric is equal to or greater than the threshold;
   assigning one of a first estimation factor and a second estimation factor to the column, the assigning comprising the first estimation factor if the column is classified as categorical and the second estimation factor if the column is classified as non-categorical, the second estimation factor being larger than the first estimation factor;
   calculating a cost estimate for system resources required to perform a database operation on the database table, the cost estimate comprising an estimated total number of distinct values in the column across all of the plurality of data partitions determined using the assigned first estimation factor or second estimation factor and a number of rows in the table as inputs to an estimation function; and
   promoting the cost estimate.

2. A computer program product as in claim 1, wherein the promoting of the cost estimate comprises using the cost estimate in developing at least part of an operation plan for performing one or more database operations involving at least one of the column and other columns of the database table in an optimal order, displaying the cost estimate via a display device associated with a computing system or device, sending an electronic message containing the cost estimate to a user or to another machine, and generating a report that includes the cost estimate.

3. A computer program product as in claim 2, wherein the one or more database operations comprises a join.

4. A computer program product as in claim 1, wherein the estimation algorithm comprises:
   selecting one data partition of the plurality of data partitions;
   querying a dictionary of the selected data partition for a total number of unique values in the column in the selected data partition, the dictionary comprising a listing of unique values of the column in the selected data partition;
   calculating a ratio of the total number of unique values to a number of rows of the column contained in the selected data partition;
   assuming that the ratio is representative of a distribution of unique values in all other data partitions of the plurality of data partitions; and
   returning the calculated ratio as the uniqueness metric.

5. A computer program product as in claim 1, wherein the estimation algorithm comprises:
   querying a dictionary on each of two or more data partitions of the plurality of data partitions, the dictionary comprising a listing of unique values of the column in each of the two or more data partitions, the querying comprising requesting a random sample comprising a preset number of the unique values in the column on each of the two or more data partitions;

comparing the random samples returned from the dictionary on each of the two or more data partitions; and returning the uniqueness metric as a degree of dissimilarity between the random samples.

6. A computer program product as in claim 1, wherein the estimation algorithm comprises:

requesting that a dictionary from each of one or more selected data partitions of the plurality of data partitions return a respective Bloom filter of a same, specific size, each dictionary comprising a listing of unique values of the column in its respective data partitions; and returning the uniqueness metric based on a degree to which the returned Bloom filter from the one or more selected data partitions is filled.

7. A system comprising:

at least one programmable processor; and a machine-readable medium storing instructions that, when executed by the at least one processor, cause the at least one programmable processor to perform operations comprising:

applying an estimation algorithm to generate a uniqueness metric representative of data in a column of a database table, the column being split across a plurality of data partitions;

classifying the column as categorical or non-categorical by comparing the uniqueness metric to a threshold, wherein the column is classified as categorical if the uniqueness metric is less than the threshold, and the column is classified as non-categorical if the uniqueness metric is equal to or greater than the threshold;

assigning one of a first estimation factor and a second estimation factor to the column, the assigning comprising the first estimation factor if the column is classified as categorical and the second estimation factor if the column is classified as non-categorical, the second estimation factor being larger than the first estimation factor;

calculating a cost estimate for system resources required to perform a database operation on the database table, the cost estimate comprising an estimated total number of distinct values in the column across all of the plurality of data partitions determined using the assigned first estimation factor or second estimation factor and a number of rows in the table as inputs to an estimation function; and promoting the cost estimate.

8. A system as in claim 7, wherein the promoting of the cost estimate comprises using the cost estimate in developing at least part of an operation plan for performing one or more database operations involving at least one of the column and other columns of the database table in an optimal order, displaying the cost estimate via a display device associated with a computing system or device, sending an electronic message containing the cost estimate to a user or to another machine, and generating a report that includes the cost estimate.

9. A system as in claim 8, wherein the one or more database operations comprises a join.

10. A system as in claim 7, wherein the estimation algorithm comprises:

selecting one data partition of the plurality of data partitions;

querying a dictionary of the selected data partition for a total number of unique values in the column in the selected data partition, the dictionary comprising a listing of unique values of the column in the selected data partition;

calculating a ratio of the total number of unique values to a number of rows of the column contained in the selected data partition;

assuming that the ratio is representative of a distribution of unique values in all other data partitions of the plurality of data partitions; and returning the calculated ratio as the uniqueness metric.

11. A system as in claim 7, wherein the estimation algorithm comprises:

querying a dictionary on each of two or more data partitions of the plurality of data partitions, the dictionary comprising a listing of unique values of the column in each of the two or more data partitions, the querying comprising requesting a random sample comprising a preset number of the unique values in the column on each of the two or more data partitions;

comparing the random samples returned from the dictionary on each of the two or more data partitions; and returning the uniqueness metric as a degree of dissimilarity between the random samples.

12. A system as in claim 7, wherein the estimation algorithm comprises:

requesting that a dictionary from each of one or more selected data partitions of the plurality of data partitions return a respective Bloom filter of a same, specific size, each dictionary comprising a listing of unique values of the column in its respective data partitions; and returning the uniqueness metric based on a degree to which the returned Bloom filter from the one or more selected data partitions is filled.

13. A computer-implemented method comprising:

applying an estimation algorithm to generate a uniqueness metric representative of data in a column of a database table, the column being split across a plurality of data partitions;

classifying the column as categorical or non-categorical by comparing the uniqueness metric to a threshold, wherein the column is classified as categorical if the uniqueness metric is less than the threshold, and the column is classified as non-categorical if the uniqueness metric is equal to or greater than the threshold;

assigning one of a first estimation factor and a second estimation factor to the column, the assigning comprising the first estimation factor if the column is classified as categorical and the second estimation factor if the column is classified as non-categorical, the second estimation factor being larger than the first estimation factor;

calculating a cost estimate for system resources required to perform a database operation on the database table, the cost estimate comprising an estimated total number of distinct values in the column across all of the plurality of data partitions determined using the assigned first estimation factor or second estimation factor and a number of rows in the table as inputs to an estimation function; and promoting the cost estimate.

14. A computer-implemented method as in claim 13, wherein the promoting of the cost estimate comprises using the cost estimate in developing at least part of an operation plan for performing one or more database operations involving at least one of the column and other columns of the database table in an optimal order, displaying the cost estimate via a display device associated with a computing system or device, sending an electronic message containing the cost estimate to a user or to another machine, and generating a report that includes the cost estimate.

15. A computer-implemented method as in claim 14, wherein the one or more database operations comprises a join.

16. A computer-implemented method as in claim 13, wherein the estimation algorithm comprises:
- selecting one data partition of the plurality of data partitions;
- querying a dictionary of the selected data partition for a total number of unique values in the column in the selected data partition, the dictionary comprising a listing of unique values of the column in the selected data partition;
- calculating a ratio of the total number of unique values to a number of rows of the column contained in the selected data partition;
- assuming that the ratio is representative of a distribution of unique values in all other data partitions of the plurality of data partitions; and
- returning the calculated ratio as the uniqueness metric.

17. A computer-implemented method as in claim 13, wherein the estimation algorithm comprises:
- querying a dictionary on each of two or more data partitions of the plurality of data partitions, the dictionary comprising a listing of unique values of the column in each of the two or more data partitions, the querying comprising requesting a random sample comprising a preset number of the unique values in the column on each of the two or more data partitions;
- comparing the random samples returned from the dictionary on each of the two or more data partitions; and
- returning the uniqueness metric as a degree of dissimilarity between the random samples.

18. A computer-implemented method as in claim 13, wherein the estimation algorithm comprises:
- requesting that a dictionary from each of one or more selected data partitions of the plurality of data partitions return a respective Bloom filter of a same, specific size, each dictionary comprising a listing of unique values of the column in its respective data partitions; and
- returning the uniqueness metric based on a degree to which the returned Bloom filter from the one or more selected data partitions is filled.

19. A computer-implemented method as in claim 13, wherein at least one of the applying, the calculating, the assigning, the calculating, and the promoting are performed by at least one programmable processor.

* * * * *